United States Patent
Oshima

(10) Patent No.: US 12,508,567 B2
(45) Date of Patent: Dec. 30, 2025

(54) FLOW MEMBER AND REACTION VESSEL

(71) Applicant: JGC JAPAN CORPORATION, Kanagawa (JP)

(72) Inventor: Naoya Oshima, Kanagawa (JP)

(73) Assignee: JGC JAPAN CORPORATION, Kanagawa (JP)

( * ) Notice: Subject to any disclaimer, the term of this patent is extended or adjusted under 35 U.S.C. 154(b) by 0 days.

(21) Appl. No.: 18/995,853

(22) PCT Filed: Nov. 6, 2023

(86) PCT No.: PCT/JP2023/039907
§ 371 (c)(1),
(2) Date: Jan. 17, 2025

(87) PCT Pub. No.: WO2024/135124
PCT Pub. Date: Jun. 27, 2024

(65) Prior Publication Data
US 2025/0256257 A1   Aug. 14, 2025

(30) Foreign Application Priority Data

Dec. 23, 2022   (JP) .................. 2022-206237

(51) Int. Cl.
*B01J 19/00*   (2006.01)
*B01J 19/24*   (2006.01)

(52) U.S. Cl.
CPC ......... *B01J 19/0046* (2013.01); *B01J 19/245* (2013.01); *B01J 2219/00299* (2013.01);
(Continued)

(58) Field of Classification Search
CPC ........ B01J 19/00; B01J 19/0046; B01J 19/24; B01J 19/245; B01J 2219/00;
(Continued)

(56) References Cited

U.S. PATENT DOCUMENTS

| 4,937,051 A | * | 6/1990 | Graven | ................. | C10G 45/58 |
| | | | | | 422/106 |
| 2013/0079563 A1 | | 3/2013 | Chiu et al. | | |

FOREIGN PATENT DOCUMENTS

| CN | 1336250 | 2/2002 |
| CN | 1478577 | 3/2004 |

(Continued)

OTHER PUBLICATIONS

Search Report (Form PCT/ISA/210) of PCT/JP2023/039907, mailed on Dec. 12, 2023, with English translation thereof, pp. 1-4.
(Continued)

*Primary Examiner* — Natasha E Young
(74) *Attorney, Agent, or Firm* — JCIPRNET

(57) ABSTRACT

A flow member and a reaction vessel are provided. The reaction vessel is constituted by the flow member together with a first reaction unit and a second reaction unit. The first reaction unit is provided inside with a first catalyst layer and including a first supply port and a first outflow port. The second reaction unit is provided inside with a second catalyst layer, including a second supply port and a second outflow port. The second reaction unit is provided below the first reaction unit. The flow member includes: a flow path forming part forming a flow path that causes a reaction liquid to flow down from an inside of the first reaction unit toward an inside of the second reaction unit; and a liquid extractor, configured to extract the reaction liquid to an outside of the flow path.

12 Claims, 8 Drawing Sheets

(52) U.S. Cl.
CPC .............. *B01J 2219/00337* (2013.01); *B01J 2219/00389* (2013.01)

(58) Field of Classification Search
CPC .... B01J 2219/00274; B01J 2219/00277; B01J 2219/00279; B01J 2219/00281; B01J 2219/00295; B01J 2219/00299; B01J 2219/00331; B01J 2219/00333; B01J 2219/00337; B01J 2219/00351; B01J 2219/00389
See application file for complete search history.

(56) References Cited

FOREIGN PATENT DOCUMENTS

| | | |
|---|---|---|
| CN | 101274256 | 10/2008 |
| CN | 101274260 | 10/2008 |
| CN | 113967449 | 1/2022 |
| JP | H0165639 | 4/1989 |
| JP | H05285367 | 11/1993 |
| JP | H0686928 | 3/1994 |
| JP | 2002263477 | 9/2002 |
| JP | 2007161709 | 6/2007 |
| JP | 2021159910 | 10/2021 |

OTHER PUBLICATIONS

"Notice of Reasons for Refusal of Japan Counterpart Application No. 2022-206237", issued on Apr. 23, 2024, with English translation thereof, p. 1-p. 8.

"Decision to Grant a Patent of Japan Counterpart Application No. 2022-206237", issued on Jul. 2, 2024, with English translation thereof, p. 1-p. 5.

"Office Action of China Counterpart Application", issued on Jun. 6, 2025, with English translation thereof, p. 1-p. 15.

"Office Action of China Counterpart Application", with English translation thereof, issued on Oct. 10, 2025, pp. 1-11.

\* cited by examiner

FLOW MEMBER AND REACTION VESSEL

CROSS-REFERENCE TO RELATED APPLICATION

This application is a 371 application of the International PCT application serial no. PCT/JP2023/039907, now WO 2024/135124, filed on Nov. 6, 2023, which claims the priority benefit of Japan Patent Application No. 2022-206237, filed on Dec. 23, 2022. The entirety of each of the above-mentioned patent applications is hereby incorporated by reference herein and made a part of this specification.

TECHNICAL FIELD

The present invention relates to a flow member constituting a reaction vessel that causes a supplied raw material liquid to pass through a catalyst layer and flow out as a reaction liquid, and a reaction vessel.

BACKGROUND ART

In designing an apparatus for producing a pharmaceutical product, a test for acquiring a reaction rate in the presence of a catalyst is performed for a raw material liquid containing a pharmaceutical raw material. This test is performed using, for example, a testing apparatus including a column that is a reaction vessel filled with a catalyst layer and a mechanism for supplying the raw material liquid to the column. In the test, for example, the above column assumes an attitude with an internal flow path extending in the vertical direction. The supply mechanism supplies the raw material liquid from above the column. This raw material liquid undergoes a reaction in contact with the catalyst layer, and flows out from below the column as a reaction liquid. In parallel with the supply of the raw material liquid, temperature adjustment is performed in the column. The reaction liquid obtained when the inside of the column is in a steady state is sampled. The above temperature adjustment in the column is performed, for example, by disposing the column in a heating/cooling apparatus.

This test will be described in more detail. A large number of columns having different times of passage of the raw material liquid from each other are prepared as the above column. That is, the prepared columns have different residence times of the raw material liquid (also different reaction times of the raw material liquid in the presence of the catalyst) from each other. Specifically, for example, columns having the same flow path diameter and different lengths are prepared. An operator sequentially replaces the columns in the testing apparatus, and the sampling described above is performed every time the columns are replaced. The concentration of the pharmaceutical raw material remaining in each sampled reaction liquid is detected using an analyzer, and the reaction rate described above is calculated on the basis of the residence time of each reaction liquid in the column and the detected concentration of the pharmaceutical raw material.

It takes time and effort to acquire the reaction rate by the test described above because it is necessary to replace the columns by the operator and to wait until the inside of the column becomes a steady state every time the columns are replaced. Patent Literature 1 discloses a reaction analysis system including a mixer to which two fluids are supplied, a reaction tube through which a fluid passing through the mixer flows, and a plurality of temperature measurement units that measure the temperature of the fluid in flow paths before and after the mixer, the reaction analysis system estimating a reaction parameter indicating a reaction state of the fluid on the basis of the temperature measured by each temperature measurement unit. However, this system has a different configuration from that of the above testing apparatus that causes a reaction between the raw material liquid and the catalyst layer, and is not a technique capable of solving the above-described problem.

CITATION LIST

Patent Literature

Patent Literature 1: JP 2021-159910 A

SUMMARY OF INVENTION

Technical Problem

The present invention has been made in view of such circumstances, and an object of the present invention is to provide a technique that enables easy analysis of reaction liquids having different reaction times from each other when a raw material liquid is caused to pass through a catalyst layer in a reaction vessel to obtain a reaction liquid for analysis.

Solution to Problem

The present invention (first invention) is a flow member constituting a reaction vessel that causes a supplied raw material liquid to pass through a catalyst layer and flow out as a reaction liquid, together with a first reaction unit and a second reaction unit,
  the flow member being provided between the first reaction unit and the second reaction unit, the first reaction unit being provided inside with a first catalyst layer and including a first supply port for supplying the raw material liquid to the first catalyst layer from above and a first outflow port for allowing a reaction liquid generated from the raw material liquid flowing down the first catalyst layer to flow out downward, the second reaction unit being provided inside with a second catalyst layer, including a second supply port for supplying the reaction liquid to the second catalyst layer from above and a second outflow port for allowing the reaction liquid flowing down the second catalyst layer to flow out to outside, and being provided below the first reaction unit,
  the flow member including:
  a flow path forming part forming a flow path that causes the reaction liquid to flow down from inside of the first reaction unit toward inside of the second reaction unit; and
  one of a liquid extractor configured to extract the reaction liquid to outside of the flow path and an attachment part provided in the flow path forming part to attach an analyzer configured to analyze the reaction liquid in the flow path from the outside of the flow path.
The second invention is the flow member according to the first invention, wherein
  the liquid extractor is provided, and
  the liquid extractor includes
  a liquid receiver configured to receive a part of the reaction liquid flowing down the flow path, and an extraction port provided in the flow path forming part to extract the reaction liquid from the liquid receiver to the outside of the flow path.

The third invention is the flow member according to the second invention, further including an opening/closing part configured to open and close the extraction port.

The fourth invention is the flow member according to the second or third invention, wherein the flow path forming part is provided with a side tube having one end side open at a position above the liquid receiver in the flow path and the other end side open at the outside of the flow path to form the extraction port, and the opening/closing part is a valve provided in the side tube.

The fifth invention is the flow member according to the fourth invention, wherein in a state where a formation direction of the flow path is a vertical direction, the side tube is inclined downward from the outside of the flow path toward the flow path.

The sixth invention is the flow member according to any one of the second to fifth inventions, wherein the liquid receiver forms a recess that stores the raw material liquid.

The seventh invention is the flow member according to the sixth invention, wherein a blocking part that blocks a part of the flow path is provided above the recess, and the blocking part is provided at a position displaced from the recess as viewed in a formation direction of the flow path.

The eighth invention is the flow member according to any one of the second to seventh inventions, wherein the flow path forming part is provided with a mounting part for mounting a measuring instrument from the outside of the flow path.

The ninth invention is the flow member according to the eighth invention, wherein the measuring instrument is a thermometer, and the mounting part is a connection hole that connects the flow path and the outside of the flow path to dispose the thermometer in the flow path by inserting the thermometer from the outside of the flow path.

The present invention (tenth invention) is a reaction vessel causing a supplied raw material liquid to pass through a catalyst layer and flow out as a reaction liquid, the reaction vessel including:

a first reaction unit provided inside with a first catalyst layer and including a first supply port for supplying the raw material liquid to the first catalyst layer from above and a first outflow port for allowing a reaction liquid generated from the raw material liquid flowing down the first catalyst layer to flow out downward;

a second reaction unit provided inside with a second catalyst layer, including a second supply port for supplying the reaction liquid to the second catalyst layer from above and a second outflow port for allowing the reaction liquid flowing down the second catalyst layer to flow out to outside, and provided below the first reaction unit; and a flow member provided between the first reaction unit and the second reaction unit and including a flow path forming part forming a flow path that causes the reaction liquid to flow down from inside of the first reaction unit toward the second supply port, and one of a liquid extractor configured to extract the reaction liquid to outside of the flow path and an attachment part provided in the flow path forming part to attach an analyzer configured to analyze the reaction liquid in the flow path from the outside of the flow path.

The eleventh invention is the reaction vessel according to the tenth invention, wherein the liquid extractor is provided, and the liquid extractor includes a liquid receiver configured to receive a part of the reaction liquid flowing down the flow path, and an extraction port provided in the flow path forming part to extract the reaction liquid from the liquid receiver to the outside of the flow path.

The twelfth invention is the reaction vessel according to the eleventh invention, wherein a plurality of sets of the first reaction units and the flow path forming parts each connected to a lower side of the first reaction unit are provided, and the second reaction unit is connected to a lower side of a composite formed by connecting the sets to each other in a longitudinal direction, and the reaction liquid is supplied instead of the raw material liquid to the first reaction units of the second and subsequent sets from an upper side in the composite.

The thirteenth invention is the reaction vessel according to the eleventh or twelfth invention, wherein the first reaction unit, the second reaction unit, and the flow path forming part are each a cylindrical body, and are connected to each other, a first flange connected to a lower portion-side flange formed at a lower end portion of the first reaction unit is provided at an upper end portion of the flow path forming part, and a second flange connected to an upper portion-side flange formed at an upper end portion of the first reaction unit or an upper end portion of the second reaction unit is provided at a lower end portion of the flow path forming part.

The fourteenth invention is the reaction vessel according to the thirteenth invention, wherein a gasket is provided between the lower portion-side flange and the first flange and between the upper portion-side flange and the second flange, and the gasket is provided with a mesh to partition the flow path and the inside of the first reaction unit or the inside of the second reaction unit.

The fifteenth invention is the reaction vessel according to any one of the eleventh to fourteenth inventions, wherein in a flow direction of the reaction liquid, a length of a first flow path accommodating the first catalyst layer in the first reaction unit is smaller than a length of a second flow path accommodating the second catalyst layer in the second reaction unit.

Advantageous Effects of Invention

The present invention enables easy analysis of reaction liquids having different reaction times from each other when a raw material liquid is caused to pass through a catalyst layer in a reaction vessel to obtain a reaction liquid for analysis.

DESCRIPTION OF EMBODIMENTS

Figure 1:
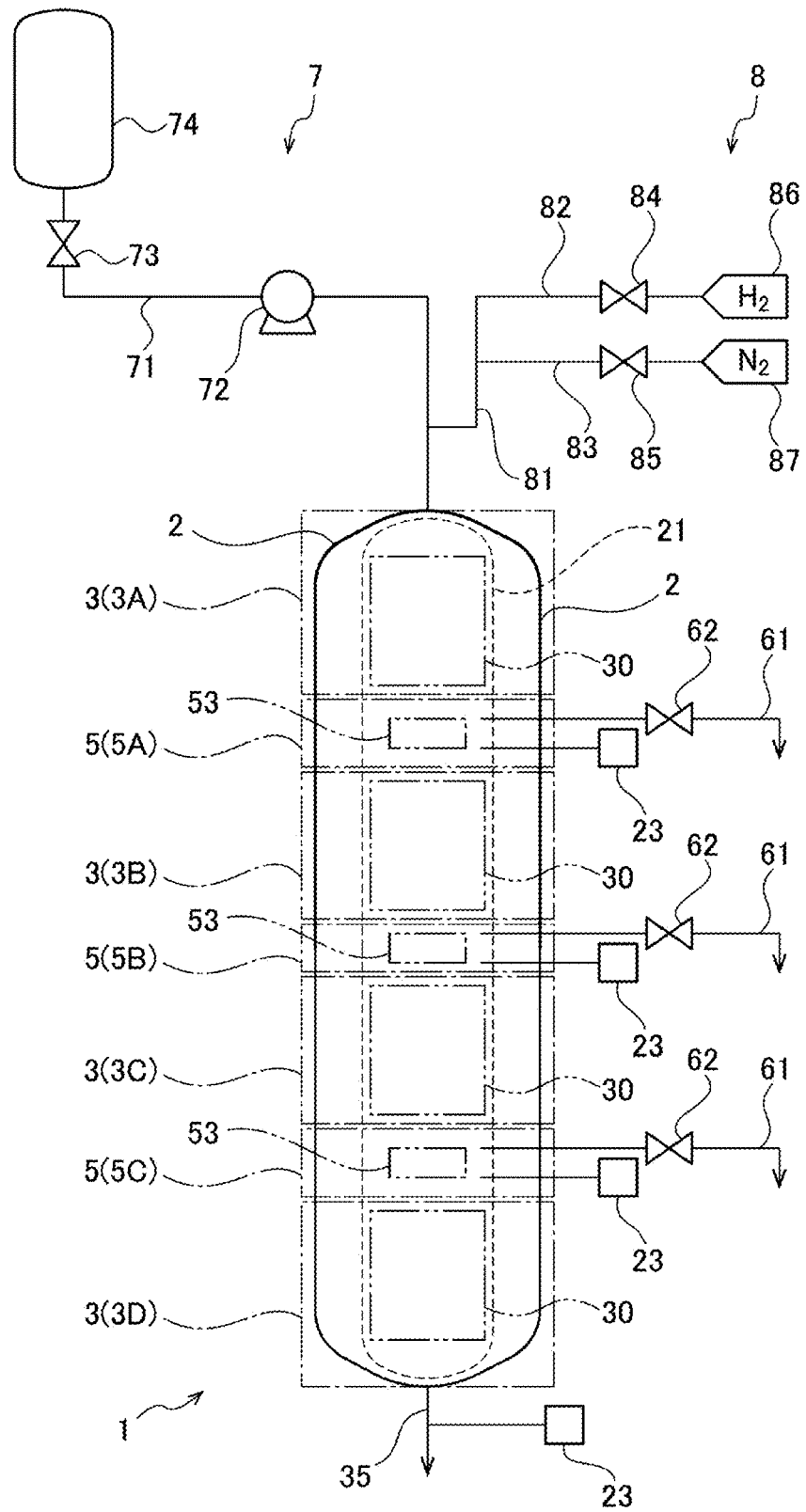
FIG. 1 is a configuration diagram of a catalytic reactor for production of a pharmaceutical product according to an embodiment of the present invention.

A catalytic reactor 1 including a reaction vessel 2 according to an embodiment of the present invention will be described with reference to a configuration diagram of FIG. 1. The catalytic reactor 1 is a testing apparatus for producing a pharmaceutical product, described in the paragraph of the background art. The outline of a configuration of the catalytic reactor 1 will be described. The reaction vessel 2 constituting the catalytic reactor 1 is configured as a vertically-long cylindrical column. A flow path 21 in the reaction vessel 2 is filled with a catalyst to form a catalyst layer 30.

A raw material liquid containing a pharmaceutical raw material is supplied to the reaction vessel 2 from above the reaction vessel 2 to flow down the flow path 21 and pass through the catalyst layer 30. During the passage through the catalyst layer 30, the pharmaceutical raw material in the raw material liquid undergoes a chemical reaction by the action of the catalyst layer 30, and the raw material liquid flows out from a lower portion of the reaction vessel 2 as a reaction liquid containing a reaction product. In the present embodiment, a $H_2$ (hydrogen) gas is supplied into the reaction vessel 2 in addition to the raw material liquid, and a hydrogenation reaction is performed as the above chemical reaction. A $N_2$ (nitrogen) gas, which is a gas for adjusting the concentration of the $H_2$ gas, is also supplied into the reaction vessel 2.

Four of the above catalyst layers 30 are provided at intervals in the flow path 21. From another viewpoint, it can be said that a catalyst layer in the reaction vessel 2 is divided into four layers in the formation direction of the flow path 21, and each of the divided layers forms the catalyst layer 30. A liquid receiver 53 that receives and holds a part of the reaction liquid flowing down to the outside of the reaction vessel 2 is provided between the catalyst layer 30 and the catalyst layer 30.

Since the catalyst layers 30 and the liquid receivers 53 are provided as described above, the reaction liquid flowing out from the lower portion of the reaction vessel 2 and the reaction liquid taken out from each of the liquid receivers 53 have different contact times with the catalyst layer 30 (that is, different reaction times in the presence of the catalyst constituting the catalyst layer 30) from each other. An operator can calculate the rate of the hydrogenation reaction of the pharmaceutical raw material by sampling these reaction liquids and detecting the concentration of the remaining pharmaceutical raw material. As described later, the reaction vessel 2 is configured such that the operator can sample the reaction liquid held in each liquid receiver 53 from the outside of the reaction vessel 2. In addition to the reaction liquid held in the liquid receiver 53, the reaction liquid flowing out from a lower end of the reaction vessel 2 is also a sampling target.

In the present specification, the raw material liquid passing through the catalyst layer 30 is described as a reaction liquid. Supplementarily, for example, when the raw material liquid is supplied into the reaction vessel 2 under a condition of low reactivity, the raw material liquid in an unreacted state may be held in the liquid receiver 53 or may flow out from the lower portion of the reaction vessel 2. This raw material liquid is also referred to as a reaction liquid. That is, the reaction liquid in the present specification includes a liquid having the same composition as that of the raw material liquid before being supplied to the reaction vessel 2.

Hereinafter, the configuration of the catalytic reactor 1 will be specifically described. The catalytic reactor 1 includes a treatment liquid supply mechanism 7 and a gas supply mechanism 8. The treatment liquid supply mechanism 7 includes a raw material liquid supply tube 71, a pump 72, a valve 73, and a tank 74. A downstream end of the raw material liquid supply tube 71 is connected to the reaction vessel 2, and the pump 72 and the valve 73 are provided in this order toward the upstream side in the raw material liquid supply tube 71. The tank 74 is connected to an upstream end of the raw material liquid supply tube 71, and the tank 74 stores the raw material liquid. The raw material liquid is supplied to the reaction vessel 2 at a predetermined speed by the pump 72 operating in a state where the valve 73 is opened.

The gas supply mechanism 8 includes a gas supply tube 81, gas supply tubes 82 and 83, valves 84 and 85, a $H_2$ gas storage part 86, and a $N_2$ gas storage part 87. A downstream end of the gas supply tube 81 is connected to a portion between the downstream end of the raw material liquid supply tube 71 and the pump 72. The gas supply tube 81 branches on the upstream side to form the gas supply tubes 82 and 83. An upstream end of the gas supply tube 82 is connected to the $H_2$ gas storage part 86 through the valve 84, and an upstream end of the gas supply tube 83 is connected to the $N_2$ gas storage part 87 through the valve 85. The $H_2$ gas storage part 86 and the $N_2$ gas storage part 87 are formed of, for example, a gas cylinder. During the supply of the raw material liquid to the reaction vessel 2 by the pump 72, the valves 84 and 85 are opened to supply the $H_2$ gas and the $N_2$ gas to the raw material liquid supply tube 71. As a result, the raw material liquid is supplied to the reaction vessel 2 together with the $H_2$ gas and the $N_2$ gas.

Figure 2:
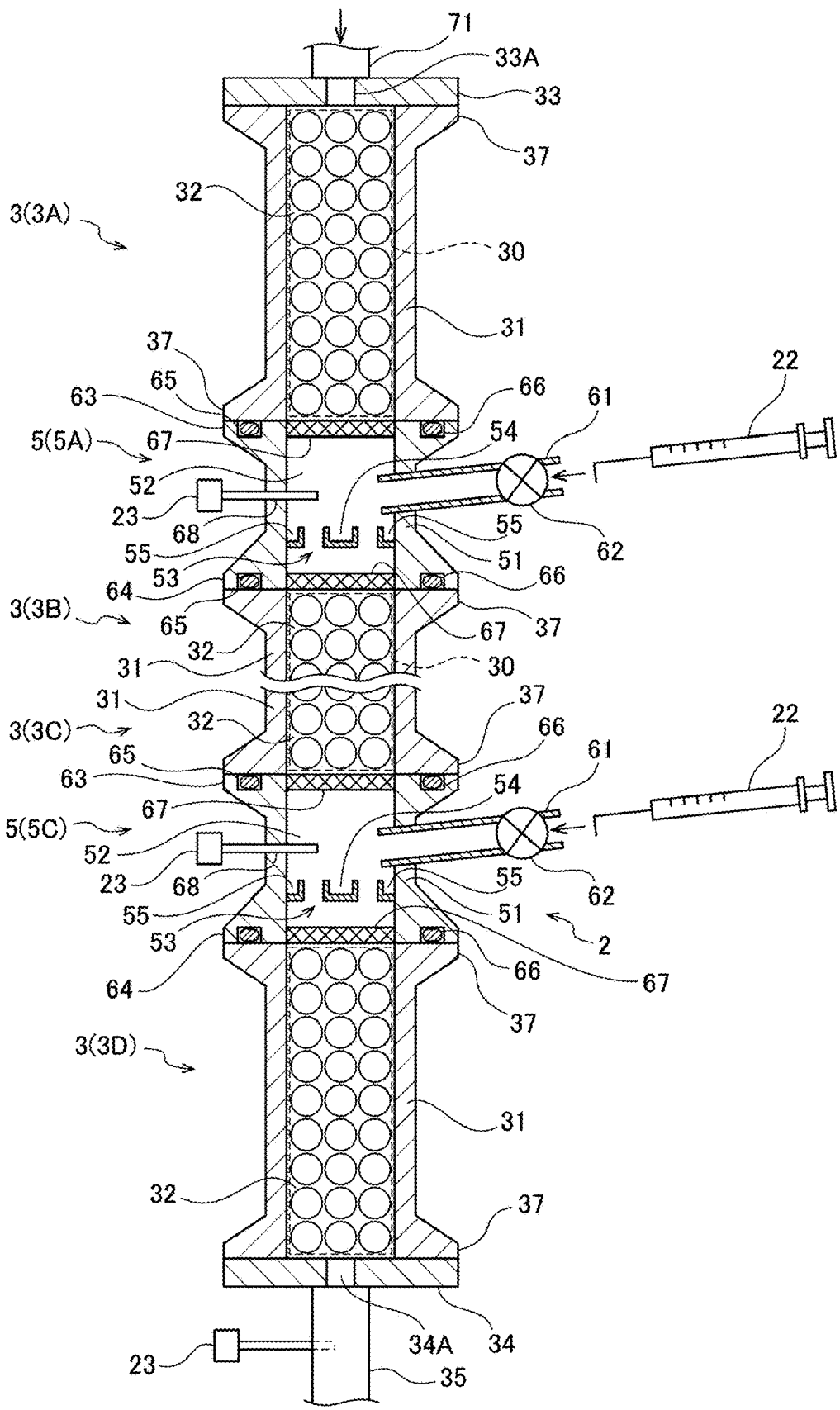
FIG. 2 is a longitudinal sectional side view of a reaction vessel constituting the testing apparatus.

The reaction vessel 2 will be described in detail also with reference to FIG. 2 that is a longitudinal sectional side view. When the reaction vessel 2 is used (that is, when the raw material liquid is supplied), the reaction vessel 2 is heated or cooled by being disposed in a heating/cooling apparatus, for example, similarly to the column described in the paragraph of the background art. In a case where heating is performed, for example, an oven can be used as the heating/cooling apparatus. Hereinafter, description will be given on the assumption that the reaction vessel 2 is in a state of being used in this manner. Therefore, the description of the attitude and orientation of the reaction vessel 2 and each member constituting the reaction vessel 2 is the description of the attitude and orientation assumed when the reaction vessel 2 is used.

The reaction vessel 2 includes four reaction units 3 each accommodating the catalyst layer 30, and three flow members 5 each accommodating the liquid receiver 53. A schematic configuration of the reaction units 3 and the flow members 5 will be described. Each reaction unit 3 includes a tube wall 31 forming a cylindrical body. The inside of the tube wall 31 is configured as a flow path 32 for the raw material liquid or the reaction liquid, and the catalyst layer 30 is provided in the flow path 32. Each flow member 5 includes a tube wall 51 forming a cylindrical body. The tube wall 51 is a flow path forming part. The inside of the tube wall 51 is configured as a flow path 52 for the reaction liquid, and the liquid receiver 53 is provided in the flow path 52. The flow paths 32 and 52 have the same diameter as each other, for example.

The tube walls 31 of the four reaction units 3 and the tube walls 51 of the three flow members 5 are connected to each other such that their central axes are aligned in plan view and extend in the vertical direction, thereby forming the cylindrical reaction vessel 2 as described above. By the connection of the tube walls 31 and 51, the flow paths 32 of the reaction units 3 and the flow paths 52 of the flow members 5 are connected to each other to form the flow path 21 of the reaction vessel 2 described above, and the formation direction of the flow path 21 (which is also the formation direction of the flow paths 32 and 52) is along the vertical axis. The reaction units 3 and the flow members 5 are alternately arranged in the vertical direction, and an upper end portion and a lower end portion of the reaction vessel 2 are each constituted by the reaction unit 3. Therefore, each of the three flow members 5 is provided so as to be sandwiched between the reaction units 3 from above and from below. Hereinafter, for convenience of description, the reaction units 3 will sometimes be referred to as 3A, 3B, 3C, and 3D from above, and the flow members 5 will sometimes be referred to as 5A, 5B, and 5C from above to be distinguished from each other.

Subsequently, the reaction units 3 will be described in detail. The reaction unit 3A is provided with an upper lid 33 that closes an upper opening of the flow path 32. The downstream end of the raw material liquid supply tube 71 is connected to the upper lid 33, and the raw material liquid is supplied into the reaction vessel 2 through a through hole 33A provided in the upper lid 33. In addition, the reaction unit 3D is provided with a lower lid 34 so as to close a lower opening of the flow path 32. An upstream end of an outflow tube 35 is connected to the lower lid 34, and the reaction liquid flows out to the outflow tube 35 through a through hole 34A provided in the lower lid 34. The flowing-out reaction liquid is sampled by the operator and used for the calculation of the above reaction rate. In addition, the outflow tube 35 is provided with a thermometer 23 to detect a temperature in the outflow tube 35. The thermometer 23 will be described together with thermometers 23 provided in the flow members 5.

The reaction units 3A to 3D are configured similarly to each other except that the upper lid 33 and the lower lid 34 are provided in the reaction units 3A and 3D, respectively. As a result, the reaction liquid similarly flows in each of the reaction units 3A to 3D, and only the time (reaction time) during which the reaction liquid sampled from each place is in contact with the catalyst layer 30 is made different. The flow path 32 of each reaction unit 3 is filled with the catalyst from an upper end portion to a lower end portion to form the catalyst layer 30 described above, and the raw material liquid or the reaction liquid flows down through a space in the catalyst of the catalyst layer 30. Since the reaction units 3A to 3D have the same configuration except for the difference in the presence or absence of the upper lid 33 and the lower lid 34 as described above, the reaction units 3A to 3D also have the same volume of the catalyst layer 30.

An upper end portion and a lower end portion of the tube wall 31 that is a cylindrical body protrude toward the outside of the cylindrical body to form flanges 37, respectively. The upper flange 37 of the reaction unit 3A and the lower flange 37 of the reaction unit 3D are connected to the upper lid 33 and the lower lid 34, respectively. The other flanges 37 of the reaction units 3A to 3D are connected to flanges 63 or flanges 64 to be described later provided in the flow members 5.

Figure 3:
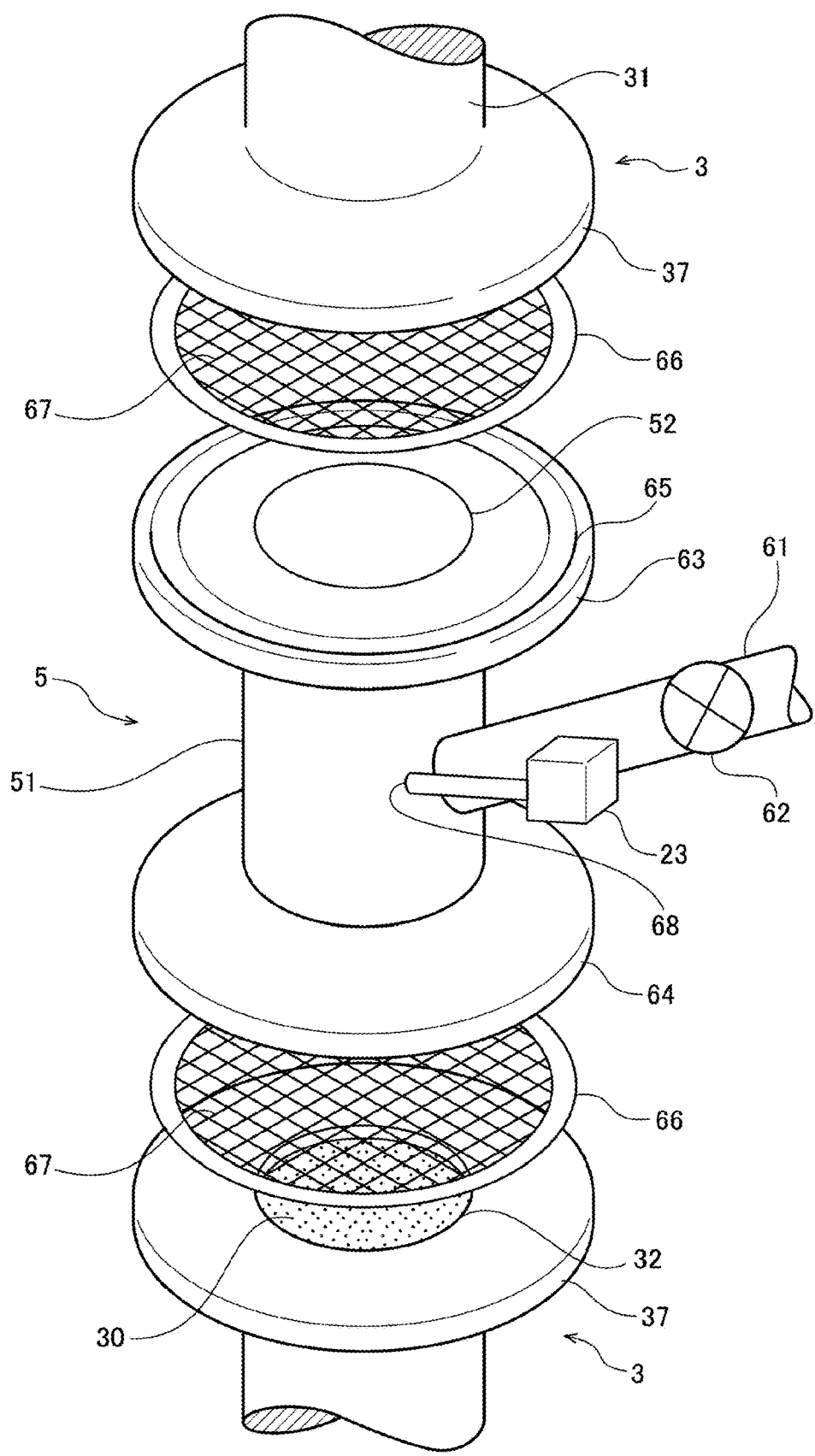
FIG. 3 is a perspective view of a flow member constituting the reaction vessel.
Figure 4:
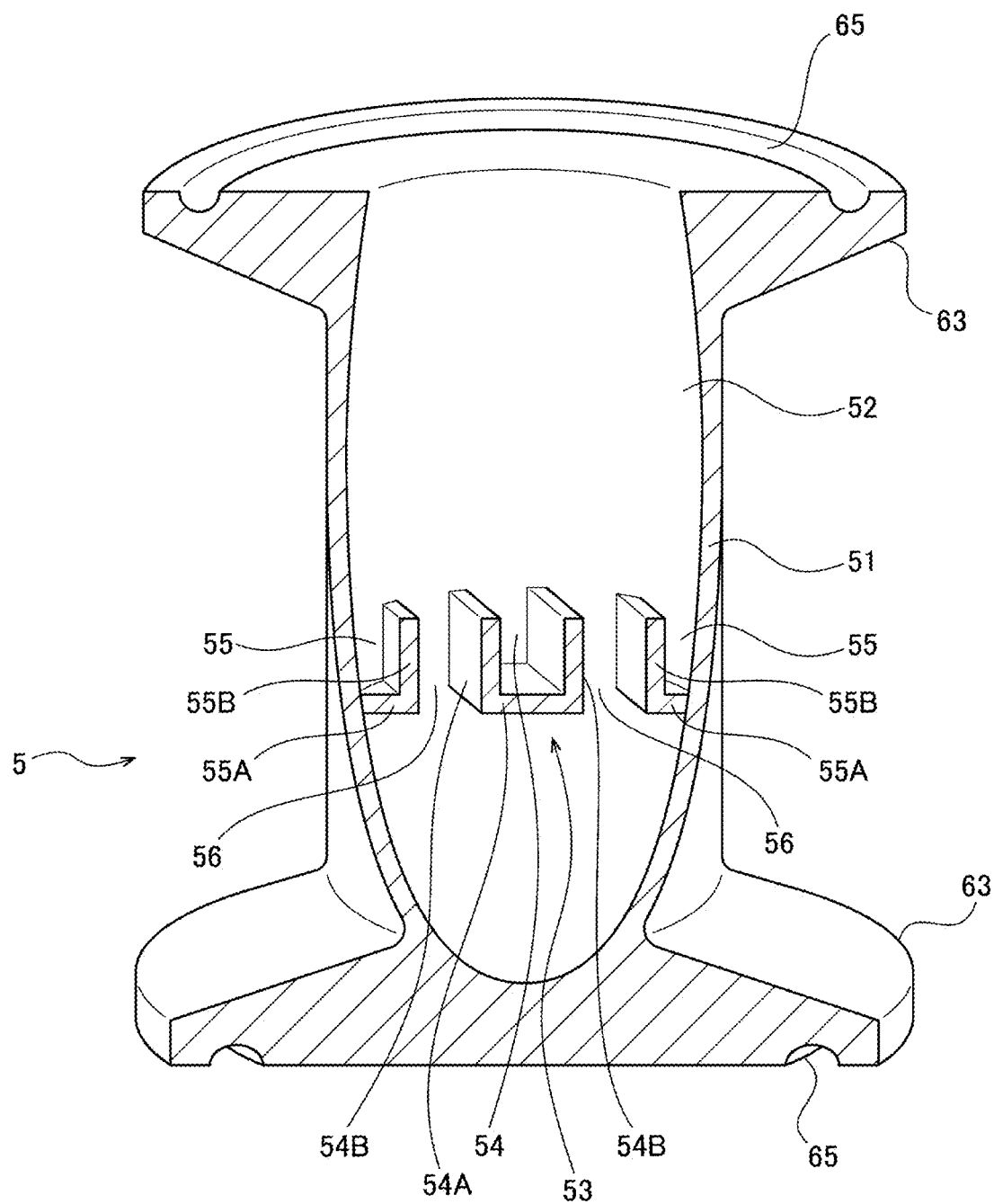
FIG. 4 is a longitudinal sectional perspective view of the flow member.

Subsequently, the flow members 5 will be described also with reference to a perspective view of FIG. 3 and a longitudinal sectional perspective view of FIG. 4. Since no catalyst layer 30 is provided, each flow member 5 does not contribute to the hydrogenation reaction of the pharmaceutical raw material, and thus the flow member 5 only needs to hold the reaction liquid by the liquid receiver 53 and to enable the operator to perform sampling. Therefore, the flow member 5 is configured as a short tube so as to prevent an increase in size of the reaction vessel 2, and has a shorter tube length than the tube length of the reaction unit 3.

The liquid receiver 53 will be described. The liquid receiver 53 includes lateral walls 54A and 55A and longitudinal walls 54B and 55B, and is provided so as to form one recess 54 and two recesses 55. The recesses 54 and 55 open upward and are provided at the same height in the flow path 52. The recesses 54 and 55 have different shapes, and the recess 54 is sandwiched between the recesses 55 from the left and right. The depths of the recesses 54 and 55 are set to be relatively small so that the reaction liquid is replaced in the recesses 54 and 55 when the reaction liquid is continuously supplied, as described later in a test procedure.

The recesses 54 and 55 will be described in more detail. A horizontal plate-shaped partition is provided so as to vertically partition the flow path 52, and two slit-shaped through holes extending in the front-back direction are formed at an interval in the left-right direction, so that the partition is divided into three portions. The divided partitions form the lateral walls 54A and 55A of the recesses 54 and 55, and the lateral walls are arranged in the order of 55A, 54A, 55A in the left-right direction. A right end and a left end of the lateral wall 54A are extended vertically upward to form the longitudinal walls 54B, and the respective longitudinal walls 54B and the tube wall 51 constitute a side wall of the recess 54. In addition, each of a right end of the left lateral wall 55A and a left end of the right lateral wall 55A is extended vertically upward to form the longitudinal wall 55B. The longitudinal wall 55B and the tube wall 51 constitute a side wall of the recess 55.

The longitudinal wall 54B and the longitudinal wall 55B face each other with a gap 56 interposed therebetween. A part of the reaction liquid in the flow path 52 falls into the recesses 54 and 55 to be accumulated in the recesses 54 and 55, and a part of the accumulated reaction liquid overflows from the recesses 54 and 55 to flow downward through the gap 56. In the flow path 52, another part of the reaction liquid directly falls into the gap 56 and flows downward through the gap 56.

In addition, the flow member 5 is provided with a side tube 61 penetrating the tube wall 51. Therefore, one end and the other end of the side tube 61 open at the flow path 52 and the outside of the flow path 52, respectively. The side tube 61 and the liquid receiver 53 constitute a liquid extractor for performing sampling. The side tube 61 is a straight tube, and is inclined downward from the outside of the tube wall 51 toward the flow path 52. The one end of the side tube 61 opens at a position above the liquid receiver 53 in the flow path 52. A portion of the side tube 61 at the outside of the tube wall 51 forms an extraction port for extracting and sampling the reaction liquid from the recesses 54 and 55, and a valve 62 is provided in the portion. When the operator opens and closes the valve 62, the extraction port is opened and closed. The valve 62 is closed so that foreign substances are not mixed into the reaction vessel 2 during the supply of the raw material liquid to the reaction vessel 2, and the valve 62 is opened at the time of sampling the reaction liquid from the liquid receiver 53.

The sampling from the liquid receiver 53 will be described. The operator inserts a syringe 22 into the side tube 61 from the outside of the reaction vessel 2 in a state where the valve 62 is opened. A syringe needle is caused to enter the recess 54 or the recess 55 to suck and sample the reaction liquid. As the syringe needle, for example, a bent needle as illustrated in FIG. 2 is used so as to be able to enter the recesses 54 and 55.

In order to facilitate entry of the syringe into the recesses 54 and 55 with the upper side open as described above, the side tube 61 is provided to be inclined such that the side tube 61 on the flow path 52 side is positioned below the side tube 61 on the outer side of the flow path 52 as described above. The inclination of the side tube 61 in this manner is also preferable from the viewpoint of preventing the reaction liquid from being stored in the side tube 61. More specifically, in a case where the side tube 61 is horizontal or inclined such that the side tube 61 on the outer side of the flow path 52 is positioned below the side tube 61 on the flow path 52 side, the reaction liquid flowing through the flow path 52 flows into the side tube 61 to be accumulated.

When the reaction liquid is accumulated in this way, the accumulated reaction liquid flows out of the reaction vessel 2 from the side tube 61 at the time of opening the valve 62 for sampling. Thus, it is necessary to receive the reaction liquid using a tool and remove the reaction liquid before sampling. In addition, depending on the length and inclination angle of the side tube 61, the reaction liquid supplied to the flow path 52 before the inside of the reaction vessel 2 becomes a steady state remains in the side tube 61 until the valve 62 is opened. That is, the reaction liquid continues to be supplied to the flow path 52, and a new reaction liquid flows into the side tube 61 near the flow path 52 to replace the reaction liquid. However, such replacement does not occur at the outside of the flow path 52, and the reaction liquid supplied before the steady state stagnates. In this case, there is a risk that the reaction liquid before the steady state adheres to and remains in the side tube 61 even after the valve 62 is opened for sampling, and when the syringe 22 is inserted into the side tube 61, the reaction liquid adheres to the syringe needle to be brought into the recesses 54 and 55, and is sucked together with the reaction liquid in the recesses 54 and 55. As described above, from the viewpoint of reducing the work and improving the detection accuracy of the concentration of the pharmaceutical raw material in the reaction liquid, it is preferable that the side tube 61 is inclined such that the side tube 61 on the flow path 52 side is positioned below the side tube 61 on the outer side of the flow path 52 to prevent the storage of the reaction liquid.

An upper end portion and a lower end portion of the tube wall 51 that is a cylindrical body protrude toward the outside of the cylindrical body to form the flanges 63 and 64, respectively. In each of the flange 63 as a first flange and the flange 64 as a second flange, an annular groove 65 is formed along an opening of the flow path 52 so as to surround the opening, and an annular gasket 66 is provided in the groove 65. The gasket 66 is provided with a mesh 67, and the mesh 67 is stretched so as to vertically partition a circular region surrounded by the gasket 66. The mesh 67 may be configured not to be connected to the gasket 66 but to be separated from the gasket 66.

The flanges 63 and 64 of the flow members 5 and the flanges 37 of the reaction units 3A to 3D are connected each with the gasket 66 therebetween, so that leakage of the reaction liquid from between the reaction unit 3 and the flow member 5 is prevented. Since the gasket 66 and the respective flanges 63, 64, and 37 are disposed in this manner, the mesh 67 partitions the flow path 32 of the reaction unit 3 (that is, the inside of the reaction unit 3) and the flow path 52 of the flow member 5. The mesh 67 prevents the catalyst constituting the catalyst layer 30 from moving to the reaction unit 3 different from the reaction unit 3 in which the catalyst is provided or the flow member 5.

In addition, a through hole 68 is provided in the tube wall 51 of the flow member 5. The through hole 68 is a connection hole that connects the flow path 52 and the outside of the flow path 52, and the thermometer 23 is inserted into the flow path 52 from the outside of the tube wall 51 through the through hole 68. Therefore, the through hole 68 forms a mounting part for mounting the thermometer 23, which is a measuring instrument, to the flow member 5. The thermometer 23 detects the temperature of the flow path 52. Therefore, a total of four thermometers including the thermometers 23 of the flow members 5A to 5C and the thermometer 23 of the outflow tube 35 are provided in the apparatus. The thermometers 23 are provided so as to correspond to the reaction units 3A to 3D, and the operator can monitor temperatures at outlets of the reaction units 3A to 3D by the temperatures detected by the corresponding thermometers 23 to determine whether the inside of the reaction vessel 2 is in a steady state. The thermometer 23 below and closest to the predetermined reaction unit 3 is the thermometer corresponding to the outlet of the reaction unit 3. Therefore, the thermometers 23 of the flow members 5A, 5B, and 5C and the outflow tube 35 correspond to the outlets of the reaction units 3A, 3B, 3C, and 3D, respectively.

Each thermometer 23 may be provided in the flow path 32 of the reaction unit 3. In this case, however, the thermometer 23 enters the catalyst layer 30. This makes the flow of the reaction liquid in a region around the thermometer 23 different from the flow of the reaction liquid in another region of the flow path 32, thereby making the reaction time in the reaction unit 3 different from an intended time, and there arises a concern that the accuracy of the calculation result of the reaction rate is reduced. Therefore, a configuration in which the thermometer 23 is provided in the flow member 5 in which the catalyst layer 30 is not provided is preferable from the viewpoint of accurately calculating the reaction rate.

The reaction unit 3 and the flow member 5 provided adjacent to the lower side of the reaction unit 3 are combined as a set. That is, the reaction unit 3A and the flow member 5A, the reaction unit 3B and the flow member 5B, the reaction unit 3C and the flow member 5C are each combined as a set, and are adjacent to each other in the vertical direction as the longitudinal direction. When the three sets adjacent to each other are combined as a composite, the reaction vessel 2 has a configuration in which the reaction unit 3D is provided adjacent to the lower side of the composite.

The reaction units 3A to 3C forming the sets correspond to first reaction units, and the upper end portions and the lower end portions of the flow paths 32 of the reaction units 3A to 3C are configured as first supply ports and first outflow ports, respectively. The reaction unit 3D forming no set corresponds to a second reaction unit, and the upper end portion and the lower end portion of the flow path 32 of the reaction unit 3D are configured as a second supply port and a second outflow port, respectively. Since the raw material liquid in contact with the catalyst layer 30 is referred to as the reaction liquid as described above, the raw material liquid is supplied to the first supply port of the reaction unit 3A forming the first set from the top, and the reaction liquid is supplied to the reaction units 3B and 3C as the first reaction units forming the second and subsequent sets from the top and the reaction unit 3D as the second reaction unit. The second outflow port of the reaction unit 3D allows the reaction liquid to flow out of the reaction vessel 2 (to the outflow tube 35). The catalyst layers 30 provided in the reaction units 3A to 3C are first catalyst layers, the catalyst layer provided in the reaction unit 3D is a second catalyst layer, the flow paths 32 of the reaction units 3A to 3C correspond to first flow paths, and the flow path 32 of the reaction unit 3D corresponds to a second flow path. The lower flanges 37 of the reaction units 3A to 3C correspond to lower portion-side flanges. The upper flanges 37 of the first reaction units (reaction units 3A to 3C) and the second reaction unit (reaction unit 3D) correspond to upper portion-side flanges.

A test procedure using the catalytic reactor 1 will be described. The reaction vessel 2 is stored in the heating/cooling apparatus, and the inside of the heating/cooling apparatus is adjusted to a predetermined temperature. The treatment liquid supply mechanism 7 and the gas supply mechanism 8 supply the raw material liquid, the $H_2$ gas and the $N_2$ gas into the reaction vessel 2. The raw material liquid passes through the catalyst layer 30 of the reaction unit 3 to become the reaction liquid, and the reaction liquid flows down the flow path 21 in the reaction vessel 2 and flows out from the reaction vessel 2 to the outflow tube 35.

As described above, while the reaction liquid is flowing in the reaction vessel 2, the reaction liquid is supplied to and stored in the recesses 54 and 55 of the liquid receiver 53 in the flow member 5. As the raw material liquid continues to be supplied to the reaction vessel 2, a part of the reaction liquid accumulated in the recesses 54 and 55 overflows from the recesses 54 and 55 and flows down to the lower reaction unit 3 through the gap 56 between the recesses 54 and 55. Since the depths of the recesses 54 and 55 are relatively small, the reaction liquid overflowing as described above includes the reaction liquid positioned on the bottom side of the recesses 54 and 55. That is, while the reaction liquid is kept stored in the recesses 54 and 55, the stored reaction liquid is continuously replaced with a new reaction liquid.

When a predetermined time elapses from the start of the supply of the raw material liquid and each gas to the reaction vessel 2, and the operator confirms that the temperature detected by each thermometer 23 is an appropriate temperature, the operator determines that the inside of the reaction vessel 2 becomes a steady state, and stops the supply of the raw material liquid and each gas to the reaction vessel 2. The operator samples the reaction liquid flowing out to the outflow tube 35 by any method, and samples the reaction liquids from the liquid receivers 53 of the flow members 5A to 5C by the above-described method. Since there is a possibility that the reaction liquid falls from above into the flow paths 52 of the flow members 5A to 5C even after the stop of the supply of the raw material liquid to the reaction vessel 2, the sampling from the liquid receivers 53 is performed quickly. The concentration of the pharmaceutical raw material in each sampled reaction liquid is detected by an analyzer.

The reaction units 3A to 3D have the same volume of the catalyst layer 30. Thus, when the reaction time of the reaction liquid sampled from the outflow tube 35 is X, the reaction times of the reaction liquids sampled from the flow members 5A, 5B, and 5C can be described as $\frac{1}{4}X$, $\frac{2}{4}X$, and $\frac{3}{4}X$, respectively, due to the difference in the number of catalyst layers 30 through which the reaction liquid passes. The rate of the hydrogenation reaction of the pharmaceutical raw material is determined from these four mutually different reaction times and the concentration of the pharmaceutical raw material detected from each sampled reaction liquid.

As described above, in the catalytic reactor 1, the samples of the four reaction liquids having different reaction times from each other can be easily acquired without replacing the reaction vessel 2 as described in the paragraph of the background art. Therefore, the time and effort required for determining the rate of the above hydrogenation reaction are reduced. Suppose that the liquid extractor (the liquid receiver 53 and the side tube 61) for performing sampling is provided in the reaction unit 3 instead of being provided in the flow member 5. In this case, as in the above-described case where the thermometer 23 is provided in the reaction unit 3, the flow of the reaction liquid in the catalyst layer 30 varies, and as a result, the calculation accuracy of the reaction rate may decrease. Therefore, in the reaction vessel 2, since the flow member 5 is provided with the liquid receiver 53 and the side tube 61, there is an effect that the reaction rate can be accurately calculated from the acquired samples of the reaction liquids in addition to the effect that the samples of the four reaction liquids can be easily obtained.

Although the flow path 21 of the reaction vessel 2 is described as being along the vertical axis, the flow path 21 may be inclined with respect to the vertical axis as long as there is no problem in the flow of the reaction liquid and the storage in the liquid receiver 53. The number of flow members 5 and the number of reaction units 3 constituting the reaction vessel of the present invention are not limited to the above-described example. Specifically, the number of sets of the flow members 5 and the reaction units 3 described above may be any number. For example, the number of sets is not limited to the plurality of sets, and may be one set. That is, the reaction vessel may be formed of only one flow member 5 and two reaction units 3 sandwiching the flow member 5. In addition, the reaction vessel 2 is not limited to the cylindrical body, and may be a square cylindrical body.

Moreover, the lower end portion of the reaction vessel of the present invention is not limited to be constituted by the reaction unit 3, and may be constituted by the flow member 5. Specifically, for example, a flow member 5D is provided so as to be adjacent to the reaction unit 3D of the reaction vessel 2 described above from below. The lower lid 34 to which the outflow tube 35 is connected is provided at a lower portion of the flow member 5D instead of being provided at the lower portion of the reaction unit 3D. Instead of sampling the reaction liquid from the outflow tube 35, sampling from the flow member 5D is performed.

Figure 5:
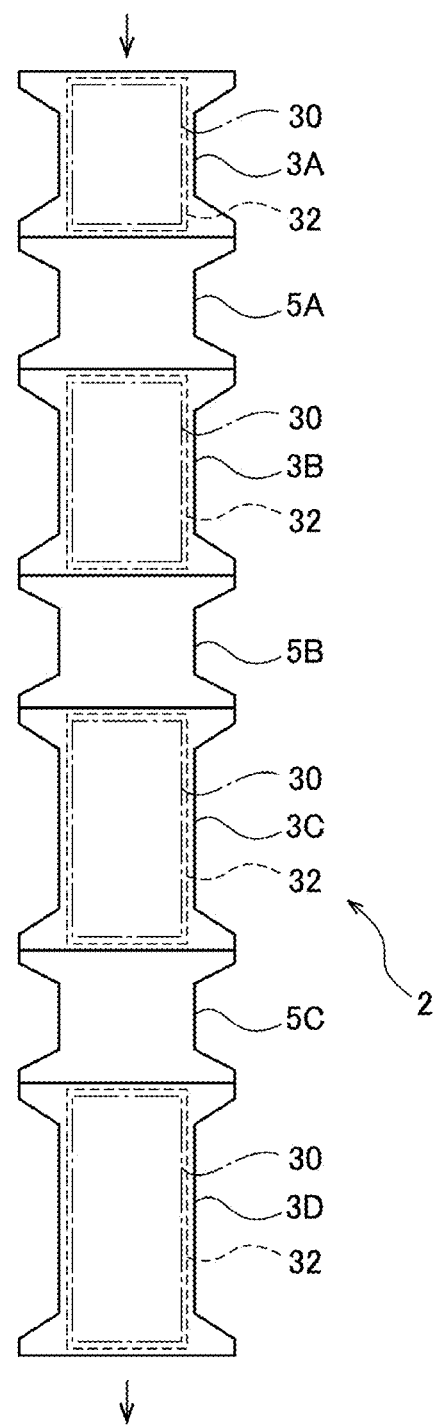
FIG. 5 is a schematic view of another example of the reaction vessel.

In addition, the volumes of the catalyst layers 30 in the respective reaction units 3 may be different from each other. As such a configuration, for example, the flow paths 32 of the respective reaction units 3 have the same diameter and different lengths from each other in the flow direction of the reaction liquid. Specifically, as an example of the configuration, the lengths of the flow paths 32 are 3A<3B<3C<3D in a schematic view of FIG. 5. Therefore, in the example illustrated in FIG. 5, the first flow path of each of the first reaction units has a shorter length than the second flow path of the second reaction unit, and among the first flow paths of the plurality of first reaction units, the upper first flow path has a shorter length. By configuring the respective flow paths 32 in this manner, the lengths of the catalyst layers 30 in the formation direction of the flow paths 32 are also 3A<3B<3C<3D. In the early stage of the reaction, the progress rate of the reaction may be higher (that is, the concentration change of the pharmaceutical raw material is larger) than that in the late stage of the reaction. In this case, according to this configuration, the number of tests to be performed can be reduced by causing the respective acquired samples to contain raw materials of different concentrations.

Figure 6:
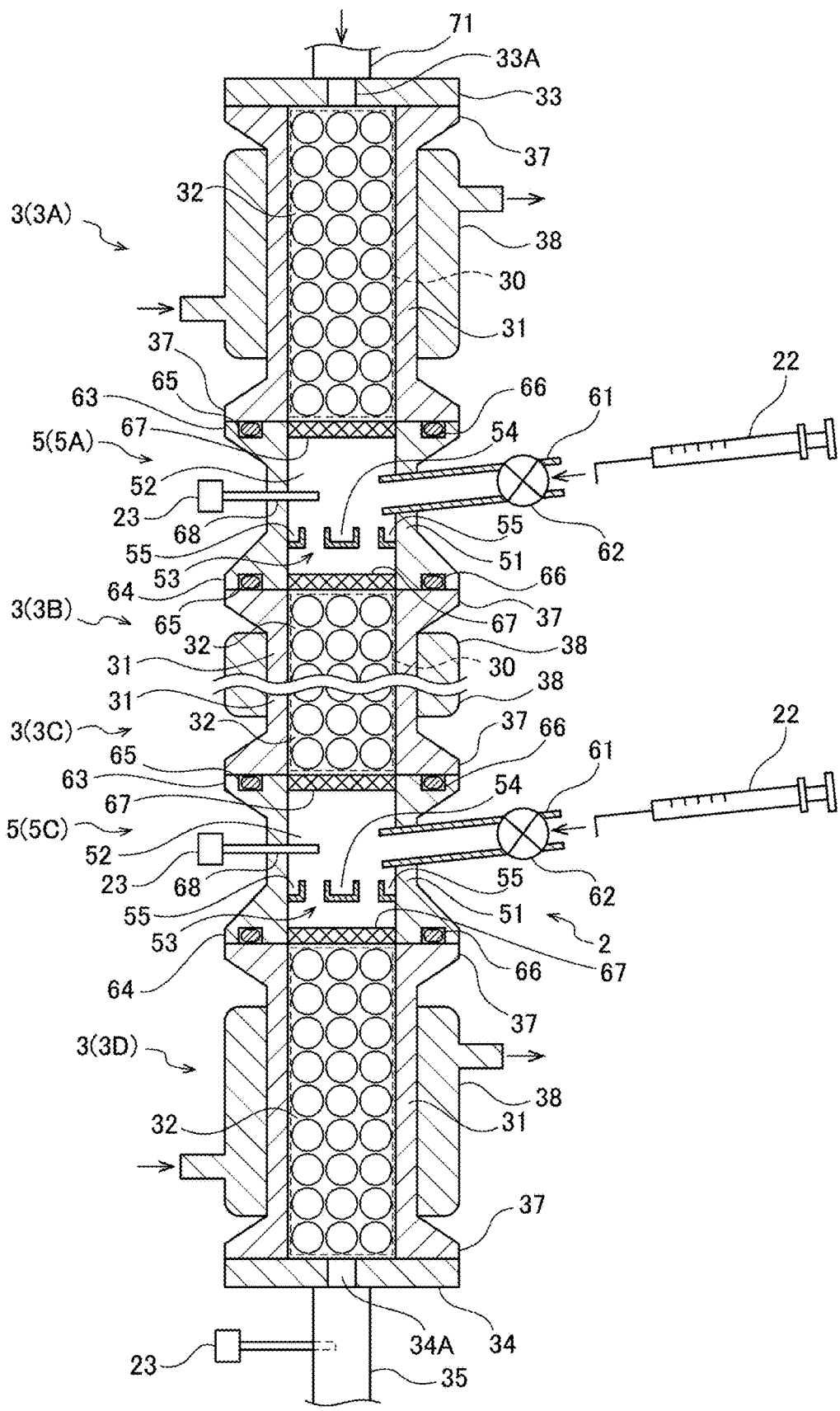
FIG. 6 is a longitudinal sectional side view of another example of the reaction vessel.

In performing the test, the reaction vessel 2 is not limited to being disposed in the heating/cooling apparatus. In order to adjust the temperature of the reaction vessel 2 in the case of not disposing the reaction vessel 2 in the heating/cooling apparatus, for example, a jacket 38 can be provided on the reaction unit 3 as illustrated in FIG. 6. The jacket 38 is provided to surround the tube wall 31 between the upper flange 37 and the lower flange 37, and a fluid flow path is formed in the jacket 38. A fluid supply tube and a fluid discharge tube are respectively connected to an upstream end and a downstream end of the flow path, and a fluid adjusted to a predetermined temperature from a fluid supply source is supplied to the flow path of the jacket 38 through the supply tube and discharged from the discharge tube. An arrow close to the jacket 38 in the drawing indicates the flow direction of the fluid. When such a fluid flows during the supply of the raw material liquid to the reaction vessel 2, the temperature of the flow path 32 of the reaction unit 3 can be adjusted. Illustration of the flow path, the fluid supply source, the supply tube, and the discharge tube in the jacket 38 is omitted.

Hereinafter, a modification of the flow member 5 will be described. The liquid receiver 53 provided in the flow member 5 may have any shape, and is not limited to forming the recesses 54 and 55 described above. For example, a horizontal plate may be provided as the liquid receiver in the flow path 52, and after completion of the supply of the raw material liquid, the operator may suck liquid droplets remaining on the horizontal plate to perform sampling. However, in order to enable sampling of a sufficient amount of reaction liquid, it is preferable to form a recess as the liquid receiver. Although the side tube 61 penetrates the tube wall 51 of the flow member 5, the present invention is also not limited to such a configuration. For example, a through hole serving as an extraction port for the reaction liquid may be formed in the tube wall 51, and the through hole may be closed by a detachable lid from the outside of the tube wall 51.

Figure 7:
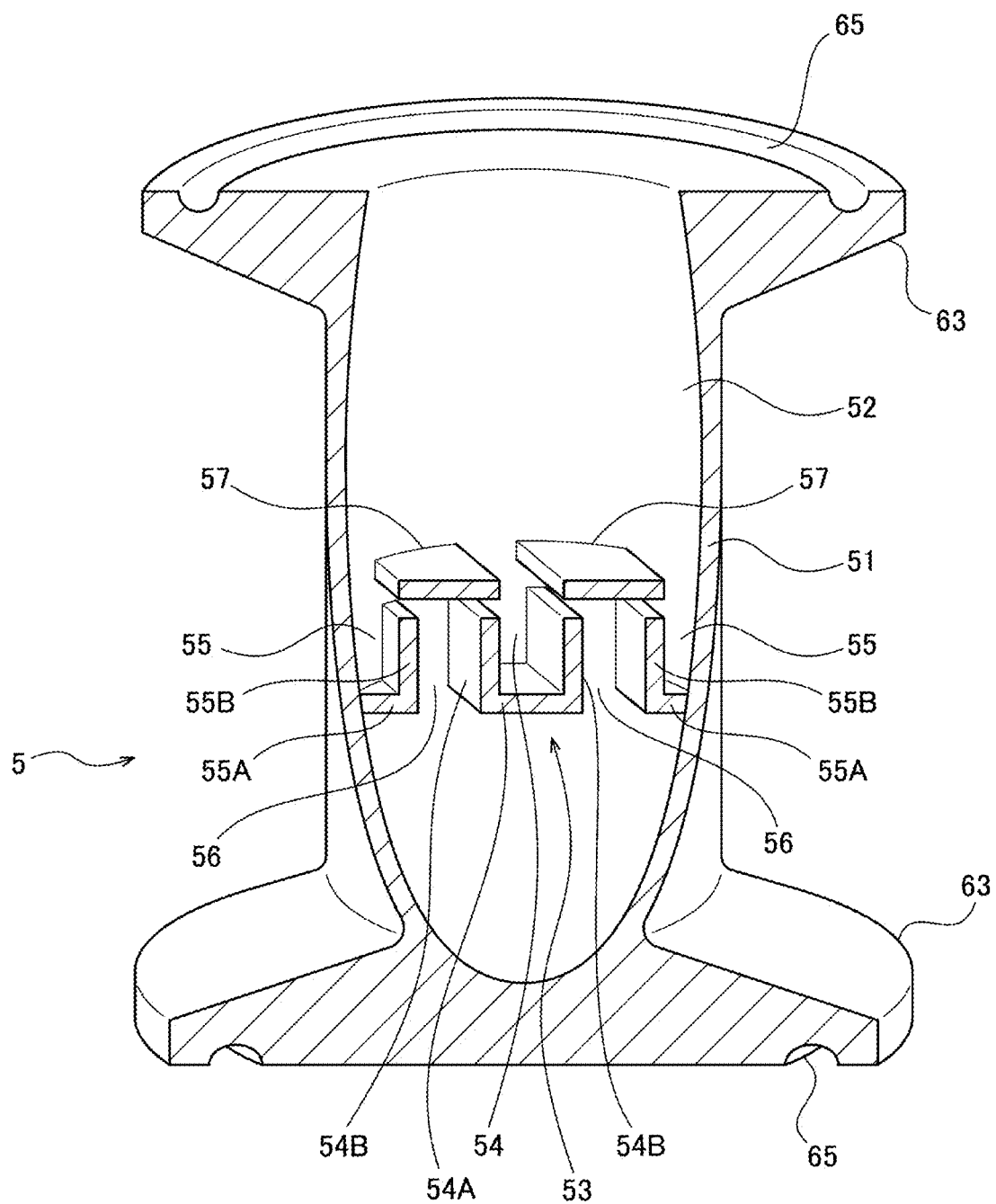
FIG. 7 is a longitudinal sectional perspective view illustrating another example of the flow member.

The flow member 5 may be provided with a blocking part 57 illustrated in a longitudinal sectional side view of FIG. 7. Two of the blocking parts 57 are provided at positions above the recesses 54 and 55 in the flow path 52 so as to extend in the front-back direction to block a part of the flow path 52, and these blocking parts 57 are located at the same height apart from each other in the left-right direction. The two blocking parts 57 are each formed in a horizontal plate shape, and a front end and a rear end of each blocking part 57 are each supported in contact with the tube wall 51. When viewed in the formation direction (vertical direction) of the flow path 52, the blocking part 57 covers the entire gap 56 immediately below the blocking part 57. Therefore, the blocking part 57 is provided at a position displaced from the recesses 54 and 55 as viewed in the formation direction of the flow path, and more specifically, is provided over the entire region where the liquid receiver 53 is not provided. One end and the other end of left and right ends of the blocking part 57 are positioned to overlap with the end of the recess 54 and the end of the recess 55, respectively. In the flow path 52, the reaction liquid flows down directly to the recesses 54 and 55, or flows down onto the blocking parts 57 and then flows to the ends of the blocking parts 57 to flow down to the recesses 54 and 55.

The reason why the blocking parts 57 are provided will be described. The reaction vessel 2 can be used for various reactions, and various kinds of raw material liquids can be used. Depending on the raw material liquid to be used and an environment in which the test is performed, the raw material liquid undergoes a reaction in contact with the catalyst layer 30 and a non-catalytic thermal decomposition reaction in a state of not being in contact with the catalyst layer 30. If the blocking parts 57 are not provided in the case of the non-catalytic thermal decomposition reaction progressing as described above, the degree of progress of the non-catalytic thermal decomposition reaction is different between the reaction liquid flowing down to the liquid receiver 53, stagnating in the recesses 54 and 55, and then supplied to the gap 56 of the flow path 52 and the reaction liquid flowing directly to the gap 56. That is, the reaction liquids in which the reactions do not uniformly progress are mixed in each flow member 5 and supplied to the lower unit. In this case, the accuracy of the calculated reaction rate may decrease. However, in a case where such a non-catalytic thermal decomposition reaction does not progress, it is not necessary to provide the blocking parts 57 as illustrated in FIG. 4 and the like. The blocking parts 57 are not limited to the horizontal plate, and may have any shape such as an inclined plate.

An in-line analyzer that analyzes the components of the reaction liquid may also be connected to the tube wall 51 of the flow member 5 from the outside. The analyzer will be described with reference to a schematic view of FIG. 8. This analyzer optically acquires the concentration of the pharmaceutical raw material in the reaction liquid by using, for example, transmitted light and scattered light, and includes a light source 91 and a detector 92 that receives the transmitted light and the scattered light. Branch tubes 93 and 94, which are short tubes, are connected to a side wall of the tube wall 51, and are open at the flow path 52 so as to face each other. Flanges 95 are formed at end portions of the branch tubes 93 and 94 on the opposite side from the flow path 52. The light source 91 and the detector 92 are connected to one flange 95 and the other flange 95, respectively, using a fixture such as a screw. Therefore, the flanges 95 form an attachment part for attaching the analyzer to the tube wall 51 from the outside to the flow path 52. With the above configuration, the detector 92 is irradiated with light (indicated by a dotted arrow in the drawing) from the light source 91 through the flow path 52, whereby the components of the reaction liquid flowing down the flow path 52 are analyzed.

Suppose that the analyzer is a probe type configured to measure absorbance and the like with the probe being inserted into the flow path 52 from the outside through the through hole 68 similarly to the thermometer 23, and the concentration of the pharmaceutical product is detected from the measurement result. In a case where the analyzer is configured as described above, the through hole 68 into which the probe is inserted forms the attachment part.

Figure 8:
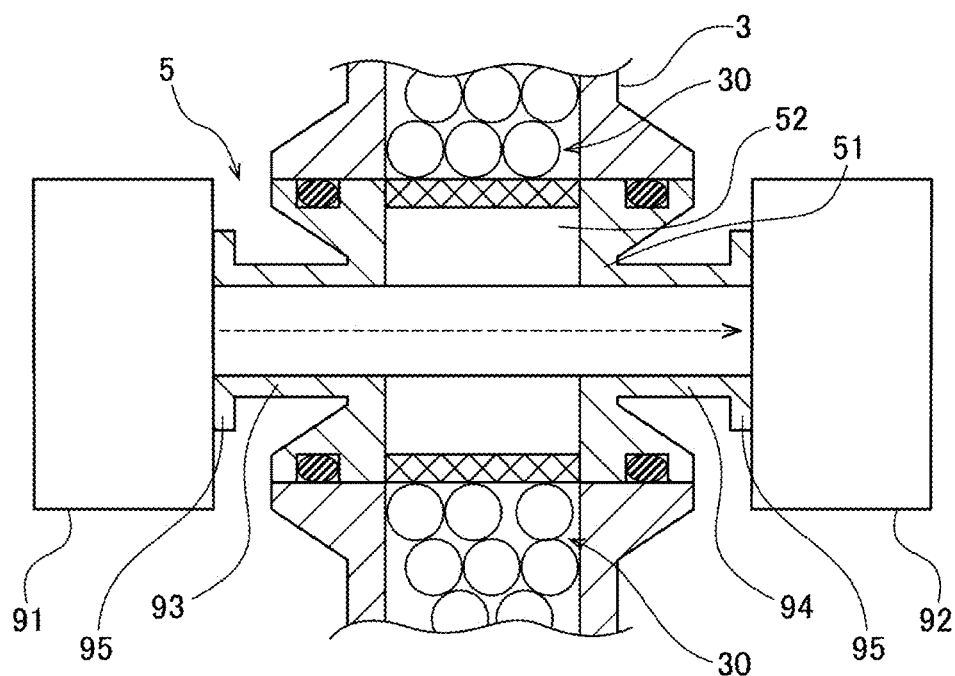
FIG. 8 is a schematic view illustrating still another example of the flow member.

As described above, a region where the catalyst layer 30 is not provided is formed as the flow member 5 in the reaction vessel 2, and the region is used as a region where the liquid extractor including the liquid receiver 53 and the side tube 61, or the analyzer is provided. In a case where the liquid extractor is provided, the liquid extractor is prevented from affecting the flow of the reaction liquid in the catalyst layer 30 as described above. On the other hand, in a case where the analyzer illustrated in FIG. 8 is provided, it is prevented that the analysis becomes impossible due to blocking of the optical path by the catalyst layer 30. As described above, the flow member 5 is also used as the region where the thermometer 23, which is a measuring instrument for monitoring the state in the reaction vessel 2, is installed, so that the thermometer 23 is prevented from affecting the liquid flow in the catalyst layer 30. The measuring instrument is not limited to the thermometer 23, and may be, for example, a pressure gauge for monitoring the pressure of the flow path 52. The pressure gauge may be provided by providing the through hole 68 in the tube wall 51 and inserting the pressure gauge into the through hole 68 from the outside of the tube wall 51 as in the case of mounting the thermometer 23. The thermometer 23 or the pressure gauge can be provided in the flow member 5 in both the cases where the liquid extractor is provided in the flow member 5 and where the analyzer is provided in the flow member 5.

Figure 9:
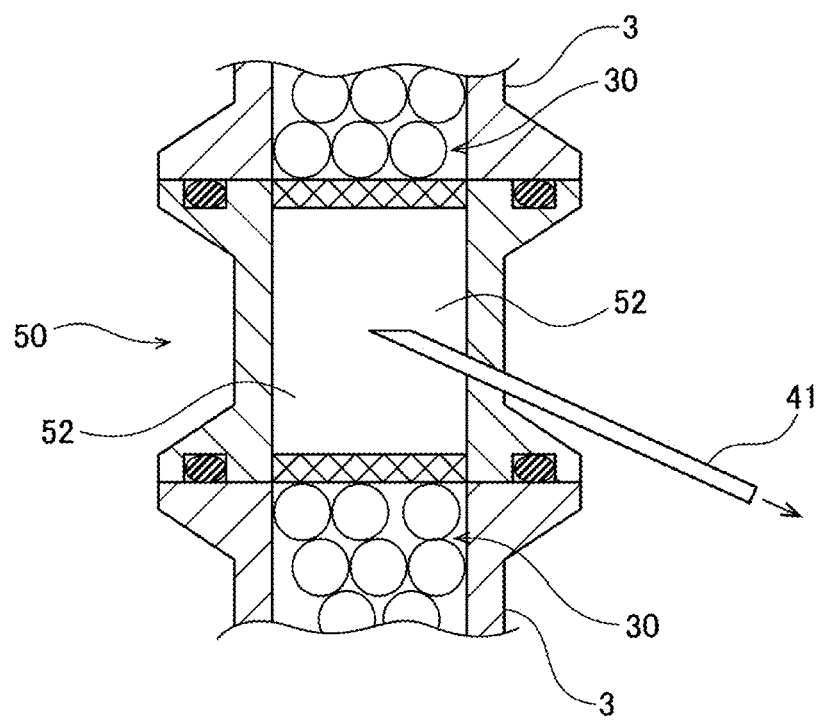
FIG. 9 is a longitudinal sectional side view illustrating a modification of the flow member.

FIG. 9 is a longitudinal sectional side view illustrating a flow member 50, which is a further modification of the flow member 5. The flow member 50 is provided instead of the flow member 5 in the reaction vessel 2. The flow member 50 will be described focusing on a difference from the flow member 5. The flow path 52 is not provided with the lateral walls 54A and 55A and the longitudinal walls 54B and 55B, and the recesses 54 and 55 are not formed. Instead, an outflow side tube 41 penetrating the tube wall 51 of the flow member 5 is provided. The outflow side tube 41 is a straight tube, is inclined upward from the outside of the tube wall 51 toward the flow path 52, and is open in the flow path 52. A part of the reaction liquid supplied to the flow path 52 passes through the lateral side of the outflow side tube 41 to flow to the lower reaction unit 3, and another part of the reaction liquid flows into the outflow side tube 41 and flows out of the reaction vessel 2. Therefore, when the raw material liquid is supplied to the reaction vessel 2, the reaction liquid flows out from the outflow side tube 41 in addition to the outflow tube 35. When the inside of the reaction vessel 2 becomes a steady state, the operator samples each of the reaction liquids flowing out from the outflow tube 35 and the outflow side tube 41.

As described above, the outflow side tube 41 forms the liquid receiver and the reaction liquid extraction port in the flow member 50, and is configured to cause the received reaction liquid to flow out to the outside of the reaction vessel 2 without storing the reaction liquid in the flow path 52. Therefore, the liquid receiver in the present invention is not limited to the configuration in which the reaction liquid is stored in the flow path 52. However, the amount of reaction liquid flowing through each reaction unit 3 becomes different, and there is a possibility that the reactivity of the pharmaceutical raw material in each reaction unit 3 varies. That is, since there is a possibility that a difference in the concentration of the remaining pharmaceutical raw material may occur among the sampled reaction liquids due to the reaction time and other factors, it is preferable that the liquid receiver is configured to store the reaction liquid in the flow path 52 as in the liquid receiver 53 described above in order to increase the accuracy of the test.

A valve may be provided in the outflow side tube 41 outside the flow path 52, the valve may be closed to store the reaction liquid while the raw material liquid is being supplied to the reaction vessel 2, and the valve may be opened at the time of sampling. However, as described in the description of the side tube 61, such a configuration may make it difficult for the reaction liquid accumulated inside to be replaced. Therefore, as the liquid receiver provided in the reaction vessel 2, it is preferable to form a recess such as the liquid receiver 53 that causes the stored reaction liquid to stay in the flow path 52. That is, it is preferable that the stored reaction liquid stays in the flow path 52 and does not move to the outside of the flow path 52.

Although the reaction vessel 2 that performs the hydrogenation reaction has been described as an example, the reaction vessel 2 is not limited to performing such a reaction, and may be one in which a plurality of kinds of liquids are mixed to undergo a chemical reaction in the presence of a catalyst, or may be one in which a thermal decomposition reaction is performed in the presence of a catalyst. Furthermore, although it has been described that the raw material liquid contains the pharmaceutical raw material, the raw material liquid may contain any compound. Therefore, the present technology is not limited to application to the field of production of pharmaceutical products.

It should be construed that embodiments disclosed herein are given by way of illustration in all respects, not by way of limitation. The above-described embodiments may be omitted, substituted, modified, or combined in various forms without departing from the scope and spirit of the appended claims.

The invention claimed is:

1. A flow member constituting a reaction vessel that causes a supplied raw material liquid to pass through a catalyst layer and flow out as a reaction liquid, together with a first reaction unit and a second reaction unit, wherein
 the flow member being provided between the first reaction unit and the second reaction unit, the first reaction unit being provided inside with a first catalyst layer and including a first supply port for supplying the raw material liquid to the first catalyst layer from above and a first outflow port for allowing a reaction liquid generated from the raw material liquid flowing down the first catalyst layer to flow out downward, the second reaction unit being provided inside with a second catalyst layer, including a second supply port for supplying the reaction liquid to the second catalyst layer from above and a second outflow port for allowing the reaction liquid flowing down the second catalyst layer to flow out to outside, and the second reaction unit being provided below the first reaction unit,
 the flow member comprising:
  a flow path forming part, constructed by a tube wall, and a flow path being formed in the tube wall for causing the reaction liquid to flow down from an inside of the first reaction unit toward an inside of the second reaction unit;
  a liquid extractor, configured to extract the reaction liquid from the flow path in the tube wall to an outside of the flow path, wherein the liquid extractor includes: a liquid receiver, disposed in the flow path and configured to receive a part of the reaction liquid flowing down the flow path, and an extraction port, provided in the flow path forming part to extract the reaction liquid from the liquid receiver to the outside of the flow path; and an opening/closing part, configured to open and close the extraction port.

2. The flow member according to claim 1, wherein
the flow path forming part is provided with a side tube, having one end side open at a position above the liquid receiver in the flow path and an other end side open at the outside of the flow path to form the extraction port, and
the opening/closing part is a valve provided in the side tube.

3. The flow member according to claim 2, wherein
in a state where a formation direction of the flow path is a vertical direction,
the side tube is inclined downward from the outside of the flow path toward the flow path.

4. The flow member according to claim 1, wherein
the liquid receiver forms a recess that stores the raw material liquid.

5. The flow member according to claim 4, wherein
a blocking part that blocks a part of the flow path is provided above the recess, and
the blocking part is provided at a position displaced from the recess as viewed in a formation direction of the flow path.

6. The flow member according to claim 1, wherein
the flow path forming part is provided with a mounting part for mounting a measuring instrument from the outside of the flow path.

7. The flow member according to claim 6, wherein
the measuring instrument is a thermometer, and
the mounting part is a connection hole that connects the flow path and the outside of the flow path to dispose the thermometer in the flow path by inserting the thermometer from the outside of the flow path.

8. A reaction vessel causing a supplied raw material liquid to pass through a catalyst layer and flow out as a reaction liquid, the reaction vessel comprising:
a first reaction unit, provided inside with a first catalyst layer and including a first supply port for supplying the raw material liquid to the first catalyst layer from above and a first outflow port for allowing a reaction liquid generated from the raw material liquid flowing down the first catalyst layer to flow out downward;
a second reaction unit, provided inside with a second catalyst layer, including a second supply port for supplying the reaction liquid to the second catalyst layer from above and a second outflow port for allowing the reaction liquid flowing down the second catalyst layer to flow out to outside, and provided below the first reaction unit; and
a flow member, provided between the first reaction unit and the second reaction unit, and including:
a flow path forming part, constructed by a tube wall, and a flow path being formed in the tube wall for causing the reaction liquid to flow down from an inside of the first reaction unit toward the second supply port,
a liquid extractor, configured to extract the reaction liquid from the flow path in the tube wall to an outside of the flow path, wherein the liquid extractor includes: a liquid receiver, disposed in the flow path and configured to receive a part of the reaction liquid flowing down the flow path, and an extraction port, provided in the flow path forming part to extract the reaction liquid from the liquid receiver to the outside of the flow path; and
an opening/closing part, configured to open and close the extraction port.

9. The reaction vessel according to claim 8, wherein
a plurality of sets of the first reaction units and the flow path forming parts each connected to a lower side of the first reaction unit are provided, and the second reaction unit is connected to a lower side of a composite formed by connecting the sets to each other in a longitudinal direction, and
the reaction liquid is supplied instead of the raw material liquid to the first reaction units of the second and subsequent sets from an upper side in the composite.

10. The reaction vessel according to claim 9, wherein
the first reaction unit, the second reaction unit, and the flow path forming part are each a cylindrical body, and are connected to each other,
a first flange connected to a lower portion-side flange formed at a lower end portion of the first reaction unit is provided at an upper end portion of the flow path forming part, and
a second flange connected to an upper portion-side flange formed at an upper end portion of the first reaction unit or an upper end portion of the second reaction unit is provided at a lower end portion of the flow path forming part.

11. The reaction vessel according to claim 10, wherein
a gasket is provided between the lower portion-side flange and the first flange and between the upper portion-side flange and the second flange, and
the gasket is provided with a mesh to partition the flow path and the inside of the first reaction unit or the inside of the second reaction unit.

12. The reaction vessel according to claim 8, wherein
in a flow direction of the reaction liquid,
a length of a first flow path accommodating the first catalyst layer in the first reaction unit is smaller than a length of a second flow path accommodating the second catalyst layer in the second reaction unit.

* * * * *